Patented Aug. 27, 1940

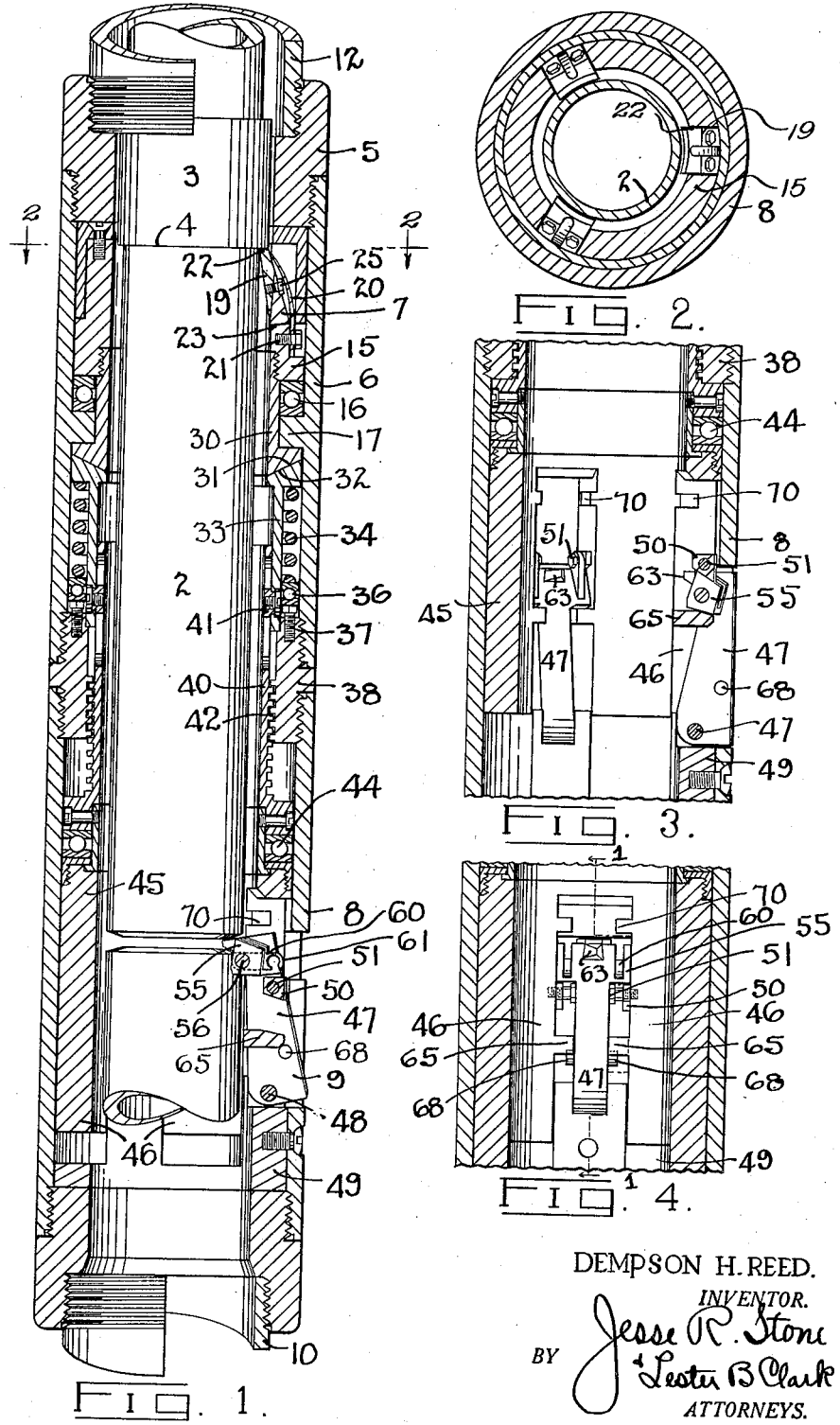

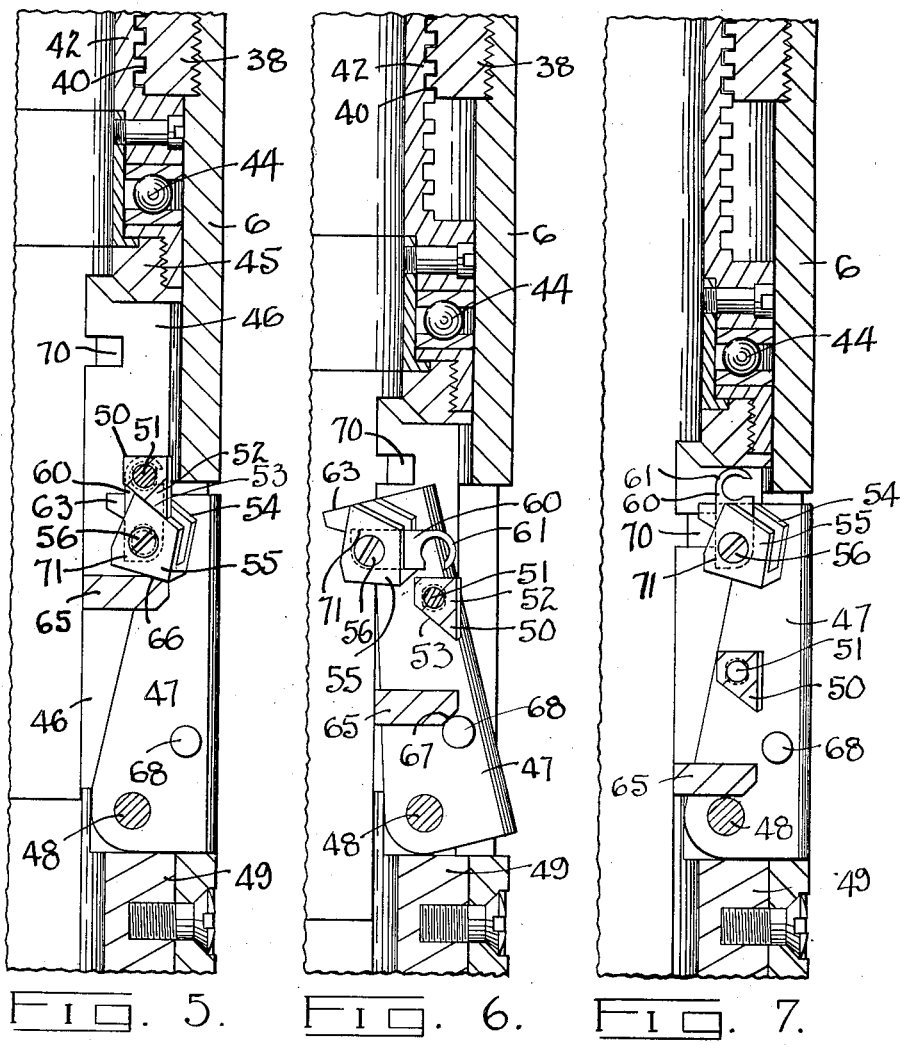

2,213,049

UNITED STATES PATENT OFFICE 2,213,049

COMPENSATING OUTSIDE PIPE CUTTER

Dempson H. Reed, Houston, Tex., assignor, by direct and mesne assignments, to D. H. Reed Company, Houston, Tex., a corporation of Texas Application May 9, 1938, Serial No. 206,742

14 Claims. (Cl. 164—0.6)

The invention relates to an outside pipe cutter of the compensating type disclosed in my copending application for patent, Serial No. 23,192, filed May 24, 1935, which has issued as Patent 2,132,645 on October 11, 1938 but embodies certain improvements thereon in the operating mechanism for the cutter members.

It is one of the objects of the invention to provide a compensating drive for outside pipe cutters wherein the cutters are held in retracted position, unlatched to accomplish the cut and returned to retracted position and locked therein.

Another object of the invention is to provide an outside pipe cutting tool wherein the cutter member is advanced by the oscillation of a pivoted block which block is advanced at a uniform rate and may be secured in position both before and after the cutting operation.

Another object of the invention is to provide co-engaging wedging faces on the cutter and on the drive mandrel so as to start the advancement of the cutter.

Another object of the invention is to provide an operating mandrel which will hold the cutter retracted until the cutting operation is performed and which will move to first release the cutter, then advance the cutter for cutting action, next retract the cutter after the cutting operation, and third to latch the cutter in retracted position so that the tool may be removed in event the cut cannot be negotiated.

Another object of the invention is to provide and anchor member for outside pipe cutters which will engage a coupling on the pipe but which may be sheared in order to obtain a release of the tool from the pipe and coupling.

Other and further objects of the invention will be readily apparent from the following description as considered with the accompanying drawings, wherein:

Fig. 1 is a vertical sectional view of the tool taken on the line 1—1 of Fig. 4 and showing the tool in operation in a well bore where it has been anchored to the pipe and the cut negotiated.

Fig. 2 is a section taken on the line 2—2 of Fig. 1.

Fig. 3 is a fragmentary vertical section showing the tool with the cutters locked in retracted position prior to the performing of the cut.

Fig. 4 is a vertical sectional view looking at the inside face of the cutter with the parts in the position of Fig. 1.

Fig. 5 is a fragmentary sectional view somewhat enlarged to show the actual construction of the cutter locked in retracted position prior to the cut.

Fig. 6 is a view similar to Fig. 5 but showing the cutter fully advanced and about to be retracted.

Fig. 7 is a view similar to Fig. 5 but showing the cutter having been retracted after the cut and locked in retracted position.

In Fig. 1 the pipe 2 is the fish or junk which is being removed from the well and is usually in the form of a drill stem made up of sections which are joined together by a coupling or drill collar 3 having a shoulder 4 on the under side thereof.

The pipe cutting tool is indicated generally at 5 and comprises a cylindrical body or housing which is made up of the cylindrical portion 6 which supports the anchor structure 7 and the lower portion of the body 8 which supports the cutter mechanism 9. Below this any desired length of pipe 10 may be connected and it is not unusual to have a shoe on the lower end of the tool to cut away any material which is about the fish 2. The operating string 12 for the tool may be rotated as the tool is lowered so that the entire tool telescopes over the fish a desired distance to where a cut is to be made. It is usual to telescope the tool over the fish as far as possible and to then cut off that portion of the pipe over which the tool has telescoped and remove it from the well.

In order that the tool may be securely fixed as to elevation, the anchor device 7 has been provided and comprises a ring 15 which is rotatably mounted on an antifriction bearing 16 which is carried on the flange 17 in the cylindrical portion 6. The ring 15 carries a plurality of upstanding dogs or fingers 19 which are normally urged inwardly by leaf springs 20. These springs are in turn held upon the ring 15 by the screws 21. The toe 22 of each dog is arranged to engage beneath the shoulder 4 on the coupling 3. The lower portion of each dog bears upon the ledge 23 of the ring 15. This arrangement prevents any upward movement of the operating string 12 or the tool 5 and a sufficient pull may be exerted on the tool to force the fingers 19 firmly beneath the coupling. Particular attention is directed to the shear pin or screw 25 which joins the upper and lower parts of the dog 19 together. If it is desired to release the tool from beneath the coupling it is only necessary to exert a sufficient pull or sharp jerk on the operating string to shear these pins 25. This will release the tool so that it can be moved upwardly. In actual practice a pull of about 30,000 pounds is normally exerted on the tool so that the total shearing stress of all the screws 25 may be say 50,000 pounds.

It seems obvious that the tool is lowered into the well bore over the fish 2 until it reaches the desired elevation where the cut is to be made. The dogs 19 will click past the couplings as the tool is lowered. When the elevation where the cut is to be made is reached the operating pipe 12 and the cutter 5 are raised until the toe 22 engages under the shoulders 4 and a sufficient pull is exerted to hold the anchor member 7 stationary with the fish 2 due to the frictional contact of the toe 22.

The anchor 7 includes a drive sleeve 30 which is threaded into the ring 15 and extends downwardly below the flange 17 to provide a friction face 31. This face will be held stationary by the anchor member. A complementary friction face 32 on the driving sleeve 33 engages the face 31 and will have a tendency to remain stationary due to this frictional contact. A spring 34 normally urges the faces 31 and 32 together and bears upon an antifriction bearing 36 so that it may rotate with the sleeve 33 in event there is relative rotation between the housing or sleeve 6 and the driving sleeve 33.

The screws 37 in the coupling 38 serve to provide for adjustment of the position of the bearing 36 and accordingly the compression applied to the spring 34. By this adjustment the friction between the faces 31 and 32 is controlled.

A drive mandrel 40 is fixed slidably but non-rotatably relative to the driven sleeve 33 by the pins 41. A course or acme thread 42 connects the mandrel 40 with the coupling 38 so that if there is relative rotation between the tool 5 and the mandrel 40, the mandrel will be forced to move longitudinally due to this threaded connection at 42. This longitudinal thrust is transmitted by the antifriction bearing 44 to a cutter drive member 45 which is in the form of an annular ring at its top having a plurality of downwardly extending legs 46. When the mandrel 40 moves downwardly, these legs will also move downwardly relative to the cutter support body 8. The legs 46 are so arranged as seen in Fig. 4 that they will straddle the cutter arms 47 which are pivoted on the shafts 48 inside of the cutter body 8 and upon a ring 49 which is fixed to the body 8.

The cutters are arranged to be held in retracted position until the place of the cut is reached. They are then advanced during the cutting operation and finally retracted and again locked in retracted position so that the tool may be removed from the well. All of these operations are accomplished by relative longitudinal movement of the drive member 45 and the legs 46 relative to the cutter arms 47 and this relative movement is caused by the advancement of the mandrel 40.

Each of the legs 46 on each side thereof carries a driving lug 50 fixed thereon which comprises a flattened pin 51 projecting from and fixed to the lug portion 52. This lug portion has a lower beveled face 53 which tapers downwardly and outwardly and is arranged as seen in Fig. 5 to engage a complementary inclined face 54 on the block 55. This block may be formed integral with or fixed upon the side of the cutter arm 47 and has a shaft 56 extending therethrough.

Both the lug 52 and the block 55 are of yoke shape construction having a central open space therein. The block 55 has a link 60 disposed therein and this link is pivoted upon a shaft 56 and arranged to assume either a vertical position as seen in Figs. 5 and 7 or a horizontal position as shown in Fig. 6. The purpose of this link is to attach the cutter arm 47 to the lug 50 while the parts are being lowered into the well bore and to drive the cutters inwardly during the cutting operation as will be later described. This link as seen in Fig. 6 has a hook 61 thereon which hooks over the pin 51 which carries the lug 52. In this manner the lug and the block are hooked together as seen in Fig. 5 and the parts will be thus assembled before the tool is lowered into the well bore. This link hooks the cutter arm in a vertical position and it cannot move about the pivot 48 unless there is a relative downward movement between the lug and the block. Inasmuch as the lug is carried by the drive member 45, it is held against vertical movement except upon relative rotation of the tool and the driving mechanism and the rate of movement thus controlled.

When the tool has been anchored under a coupling 3 and rotation imparted to it, the drive member 45 and the lug 50 move downwardly so that there is a very little sliding movement between the faces 53 and 54 before they separate as the arms 47 tilt inward. Inasmuch as the lug 50 is constrained to move in a vertical path with the legs 46, any downward movement of the lug tends to move the block 55 in a counterclockwise direction to the left, as seen in Figs. 5, 6, and 7. This movement throws the shaft 56 forwardly so that continued downward movement of the lug 50 and flattened pin 51 will exert a thrust on the link 60 and the tilting movement of this link advances the cutter. As the drive members continue to advance, the cutter arms 47 are tilted inwardly to advance the cutter blades 63 against the pipe 2. As seen in Fig. 6 the cutter has been completely advanced by the driving movement by the link 60. When, however, the link is moved to a horizontal position and has controlled the movement of the cutter arm 47, the shaft 51 is so flattened on its sides that it will pass out of the hook 61 as seen in Fig. 6 and the function of the link has thus been completed, in that it advanced the cutter arm at a uniform rate and has prevented the cutter from advancing independently of the friction drive.

In order to insure that the cutter arms 47 will remain in retracted position while the device is being lowered into the well bore, a control arm 65 has been positioned upon the side of the legs 46. This arm is so arranged that when the parts are assembled as in Fig. 5, that the upper face 66 thereof will abut the under side of the block 55 and hold it against inward movement. When, however, the legs move downwardly upon relative rotation of the tool and anchor and the lug 50 begins to advance, this control arm 65 simultaneously moves with the leg and releases the cutter block 55. As the cutter is advanced by downward movement of the drive member 45, the control arm 65 continues to move downwardly until it reaches the position of Fig. 6 when the cutter arms are fully advanced.

Particular attention is directed to the action of the link 60 in that as the cut is started the rate of advancement is relatively fast with a small advancement of the drive mechanism, but, as the cut continues and the link approaches the horizontal the rate of inward movement of the lower end is reduced so that greater power is then applied and the cutting is slower. The above is true because of the friction drive which is set to transmit only a certain amount of power so that the slower movement multiplies the power available. It should also be noted that when the link 60 approaches the arc on which the top of the arm 47 is moving there is a direct thrust for greatest power by a direct thrust but as the link passes this arc the power is applied through the leverage of the cutter arm 47 and still further increased in this manner because of the arrangement of the pivot pins or shafts.

The beveled face 67 on the arm 65 is then arranged to contact the return pin 68 projecting from the side of the cutter arm 47. Continued movement of the drive member 45 in a downward direction causes the face 67 to cam over the surface of the pin 68 and tilt the cutter arm 47 back to its retracted or vertical position. The control arm 65 is arranged to stop just above the shaft 48 in this final downward position.

A locking lug 70 is best seen in Fig. 4 and is carried by the legs 46. This lug is positioned near the top of the drive member 45 and is so disposed that as the drive member advances to its lowermost or final position, this lug will engage the heel 71 of the link 60 and tilt the link upwardly about the shaft 56 to the position shown in Fig. 7 where it will not project from the cutter housing and where it will be held in retracted position. This arrangement locks the cutter arms 47 against tilting inwardly and insures that the tool may be removed from the well without damaging the cutters.

In operation the tool will be lowered into the well bore, anchored beneath the coupling and as upward pull is being exerted the tool will be rotated. This rotation carries the cutter arms 47 and cutters 63 amound the fish 2. The anchor 7 remains stationary and the friction faces 31 and 32 tend to hold the sleeve 33 stationary. This, in turn, holds the mandrel 40 stationary so that there will be a movement at the threads 42 to cause the mandrel 40 to move longitudinally downward. This downward movement is permitted by the slotted construction at 41 and moves the drive member 45 and the legs 46 downwardly inside of the housing. This movement releases the control arm 65 and the lug 52 bears upon the cutter block 55 to tilt the cutter arms 47 inwardly. The cutters 63 cut into the pipe, as seen in Fig. 1.

In event the resistance to cutting or to advancement of the cutters 63 into the pipe is of a sufficient amount to substantially resist the downward movement of the mandrel 40, then this resistance will be transmitted to the friction faces 31 and 32 and if the resistance is great enough, then the sleeve 33 will be caused to rotate and there will be a sliding movement at the friction drive so that the drive is due to the differential pressure between the friction drive and the resistance to cutting. In this manner the tool compensates for any excessive resistance and if one of the cutters becomes lodged in the cut, the friction drive will yield and the cutter will not be damaged. Adjustment of the spring 34 determines the action of this friction or compensating drive. As the drive member advances, the control arm 65 will cause the cutter to be retracted and continued movement cause the lug 70 to lock the cutter in retracted position.

Broadly the invention contemplates a compensating frictional drive outside pipe cutting tool wherein the cutter movement is controlled and the cutter may be locked in both initial and final position.

What is claimed is:

1. An outside pipe cutter including a body, cutters thereon, an anchor, a friction drive therefrom, a driving mandrel rotatable by said body and advanced axially thereof by the differential pressure of said friction drive over the resistance to advancement of said cutters into the pipe being cut, and means on said mandrel to initially lock, then release and advance said cutters and finally retract and again lock said cutters.

2. In an outside pipe cutter an anchor, a drive mandrel, a frictional compensating drive for said mandrel, a body, cutter arms pivoted thereon, drive lugs on said mandrel, cooperating cam faces on said lugs and cutter arms, a link connecting said arms and lugs and holding said faces in engagement, said link being releasable when said cutter arms are fully advanced, additional means on said mandrel to retract said cutter arms after release of said link, and additional means on said mandrel to engage said cutter arms as they are retracted and lock such arms in retracted position.

3. In an outside pipe cutter an anchor, a drive mandrel, a frictional compensating drive for said mandrel, a body, cutter arms pivoted thereon, drive lugs on said mandrel, cooperating cam faces on said lugs and cutter arms, a link connecting said arms and lugs and holding said faces in engagement, said link being releasable when said cutter arms are fully advanced, additional means on said mandrel to retract said cutter arms after release of said link, and additional means on said mandrel to engage said cutter arms as they are retracted and lock such arms in retracted position, said friction drive including a threaded connection to be advanced as a function of the resistance to cutting.

4. In an outside pipe cutter, a cutter arm, control means for said arm, said means including a cutter drive member, a lug thereon, an integral block on said cutter arm, means to hold said lug and block engaged while the cutter arms are advanced and releasable thereafter to allow said arms to be retracted.

5. In an outside pipe cutter, a cutter arm, control means for said arm, said means including a cutter drive member, a lug thereon, an integral block on said cutter arm, means to hold said lug and block engaged while the cutter arms are advanced and releasable thereafter to allow said arms to be retracted, and means to retract said arms including a control arm on said cutter drive member.

6. In an outside pipe cutter, a cutter arm, control means for said arm, said means including a cutter drive member, a lug thereon, an integral block on said cutter arm, means to hold said lug and block engaged while the cutter arms are advanced and releasable thereafter to allow said arms to be retracted, means to retract said arms including a control arm on said cutter drive member, and additional means movable by said cutter drive member against said cutter arms to hold them retracted.

7. In an outside pipe cutter, cutter arms, a drive mechanism for said arms, means to connect said arms to said mechanism until the cutting action is performed and thereafter releasable from said mechanism, and additional means on said mechanism and arms to move into engagement to retract said arms after release of said means.

8. In an outside pipe cutter, cutter arms, a drive mechanism for said arms, means to connect said arms to said mechanism until the cutting action is performed and thereafter releasable, additional means on said mechanism and arms to move into engagement to retract said arms after release of said means, and still further additional means on said mechanism to move into engagement with said arms to lock them in retracted position.

9. In an outside pipe cutter, cutter arms, a drive mechanism for said arms, means to connect said arms to said mechanism until the cutting action is performed and thereafter releasable, additional means on said mechanism and arms to move into engagement to retract said arms after release of said means, and still further additional means on said mechanism to move into engagement with said arms to lock them in retracted position, said further additional means also engaging said first means to move it to an inoperative position.

10. In a pipe cutter, pivoted cutter arms, a drive mechanism to control the movement of said cutters, and a link connecting said arms and mechanism, said link being tiltable as said mechanism advances to move said arms, the tilting movement of said link advancing said arms to cut first at a greater rate and as said link tilts to approach a horizontal position the rate decreases.

11. In a pipe cutter, pivoted cutter arms, a drive mechanism to control the movement of said cutters, and a link connecting said arms and mechanism, said link being tiltable as said mechanism advances, to move said arms, the tilting movement of said link advancing said arms to cut first at a greater rate and as said link tilts to approach a horizontal position the rate decreases, and with an increase in power proportional to the decrease in the cutting rate.

12. In a pipe cutter including cutters and a drive mechanism, a link connecting said cutters and mechanism, said mechanism including means to move the top of said link vertically downward, said cutter being pivoted to move the bottom of said link inwardly whereby said link moves from a vertical to a substantially horizontal position in advancing said cutters.

13. In a pipe cutter including cutters and a drive mechanism, a link connecting said cutters and mechanism, said mechanism including means to move the top of said link vertically downward, said cutter being pivoted to move the bottom of said link inwardly whereby said link moves from a vertical to a substantially horizontal position in advancing said cutters, whereby the rate of movement is greater as said link begins to move and the power applied is greater as said link approaches the horizontal.

14. In a pipe cutter including cutters and a drive mechanism, a link connecting said cutters and mechanism, said mechanism including means to move the top of said link vertically downward, said cutter being pivoted to move the bottom of said link inwardly whereby said link moves from a vertical to a substantially horizontal position in advancing said cutters, whereby the rate of movement is greater as said link begins to move and the power applied is greater as said link approaches the horizontal, the connections for said link and the pivot for said cutters being so disposed and arranged as to take advantage of the leverage of said cutter as the link approaches the horizontal.

DEMPSON H. REED.